US012454446B1

(12) United States Patent
Norman

(10) Patent No.: US 12,454,446 B1
(45) Date of Patent: Oct. 28, 2025

(54) ENGINE DEVICE TO GENERATE CONTINUOUS LIFTING OPERATION

(71) Applicant: Valentino Norman, Plymouth, NC (US)

(72) Inventor: Valentino Norman, Plymouth, NC (US)

( * ) Notice: Subject to any disclaimer, the term of this patent is extended or adjusted under 35 U.S.C. 154(b) by 156 days.

(21) Appl. No.: 17/897,131

(22) Filed: Aug. 27, 2022

(51) Int. Cl.
*B66F 3/24* (2006.01)
*B66F 3/25* (2006.01)
*B66F 9/04* (2006.01)
*H01F 7/16* (2006.01)

(52) U.S. Cl.
CPC ................ *B66F 3/24* (2013.01); *B66F 3/242* (2013.01); *B66F 3/25* (2013.01); *B66F 9/04* (2013.01); *H01F 7/1607* (2013.01)

(58) Field of Classification Search
CPC ... B23Q 1/01–017; B23Q 7/005; B66F 19/00; B66F 3/00; B66F 3/24; B66F 3/242; B66F 3/247; B66F 3/25–32; B66F 3/43–46; B66F 7/00; B66F 7/04; B66F 7/08; B66F 7/085; B66F 7/16; B66F 7/20; F02D 13/0253; B25J 5/00; B25J 5/02; F16K 31/06555; H01F 7/1623; H01F 7/1607
See application file for complete search history.

(56) References Cited

U.S. PATENT DOCUMENTS 2,842,334 A * 7/1958 Short ...................... F15B 21/08 335/251
3,017,546 A * 1/1962 Bates .................... H01F 7/1607 335/264

* cited by examiner

*Primary Examiner* — Tyrone V Hall, Jr.
(74) *Attorney, Agent, or Firm* — Robert Joseph Hess; Hess Patent Law Firm

(57) ABSTRACT

An engine device for generating continuous lift operation is disclosed. The engine generates a continuous lift operation using one or more solenoids. Each solenoid coil has a plunger. Both solenoid coils are open ended, thereby allowing the plungers to move from the front to the back of its solenoid coil. The engine further comprises one or more brackets including a carriage bracket and a mounting bracket. Both the solenoids and the plungers are mounted on the carrying bracket. The mounting bracket is attached to a load that would be propelled. Once it is attached, the pilot or operator will energize the initiatory solenoid coil and de-energize the drive solenoid plunger by striking the extended portion. When the drive solenoid strikes the bumper at the top of the mounting bracket it de-energizes and returns to the original position by return springs. This firing action is repeated for providing continuous propulsion.

11 Claims, 7 Drawing Sheets

ENGINE DEVICE TO GENERATE CONTINUOUS LIFTING OPERATION

TECHNICAL FIELD

The present invention generally relates to combustion engines. More specifically, the present invention relates to an engine device and a related method being configured to generate continuous lift operation using solenoids.

BACKGROUND

Combustion engines are devices that are used in a wide variety of applications, such as in powered vehicles. In the operation of the engine, it may be important to be able to govern or limit the rotational speed of the engine under certain circumstances. There exists a challenge for engines to operate in compliance with, continuous lifting operation. There exist various solutions to run the engine for continuous lift operation using solenoid valves.

The earliest valve lift systems lift by switching between slow and fast cams at a threshold point. Such a discrete mechanism not only creates a step in the power curve (which is perceived as "unrefined") but its breathing is also a compromise. An ideal variable valve lift (VVL) system should be capable of varying valve lift continuously according to rev that is, the higher the rpm, the higher lift is required. While compared with a fixed valve lift compromised for mid-range rev, VVL enhances power at high rev by supplying the engine with more air to breath. Moreover, car makers can make use of CVVL to regulate engine output, thus eliminating the need of throttle butterfly and reduce so called "pumping loss".

However, the existing solutions may have a possibility for fire issues. Few existing solutions use momentum transfer as a method for operation, which is a very inefficient form of energy transfer. Further, they may not take well to depletion and eventually requires another lift method. Therefore, there is a need for an engine device and related method for providing continuous lift operation using one or more solenoids. Also, there is a need for a device configured to make a repeated firing action to provide continuous propulsion.

SUMMARY

The present invention generally discloses an engine device for generating lifting operations. More specifically, the present invention relates to an engine device and related method configured to generate continuous lift operation using solenoids.

According to the present invention, an engine device is configured to generate a continuous lift operation by the means of one or more solenoids. In one embodiment, the engine generates a continuous lift operation using at least two solenoids including a first solenoid/solenoid coil and a second solenoid/solenoid coil. The solenoids are set in tandem. In one embodiment, the first solenoid is an impact initiatory and the second solenoid is a drive solenoid. The first solenoid coil has a first plunger and the second solenoid coil has a second plunger. Both solenoid coils are open ended, thereby allowing the plungers to move from the front to the back of its solenoid coil. The purpose of this type of solenoid is so that the first plunger can be poised in position behind the second solenoid plunger.

In one embodiment, the engine further comprises one of more brackets. In one embodiment, the engine comprises at least two brackets including a carriage bracket and a mounting bracket. Both the solenoids and the plungers are mounted on the carriage bracket. In one embodiment the carriage bracket is connected to the mounting bracket through a system of wheels, bearings or lubrication that will allow the carriage bracket to reciprocate freely in a linearly motion on its mounting bracket.

In one embodiment, the mounting bracket is attached to a device or load that would be propelled. The mounting bracket is longer and wider than the carriage bracket, thereby giving the carriage bracket clearance to move in the confine of the mounting bracket. In one embodiment, the impact initiatory solenoid coil is mounted on springs near the rear or bottom portion of the carriage bracket shaft. The springs rest on stoppers that hold them in a fixed portion on the shaft. The initiatory impact solenoid coil plunger has a flange on each opposite end, thereby preventing the plunger from leaving its solenoid coil. The impact initiatory solenoid plunger rests its flange on the top of its coil poised for firing. The majority of the plunger protrudes out the bottom of the solenoid coil.

In one embodiment, both solenoids have elongated portions that would be narrower than the main portion of the plunger, so that the main portion can be positioned below the threshold of its solenoid coil for maximum velocity. That is, the plunger did not center its coil at this time and the initiatory solenoid plunger is held in position by a spring that is attached from the bottom of the plunger to the bottom plate of the carriage to the top portion of the initiatory solenoid coil that is connected to the carriage shaft. The carriage shaft has a stopper to limit its reciprocating movement.

In one embodiment, the drive solenoid/second solenoid is mounted directly over the number one or initiatory solenoid and plunger. The drive solenoid plunger is attached to the top pleat of the carriage in a fixed portion that would allow little or no movement, however its solenoid coil is allowed to move from the approximate center to the top of the carriage pleat. The drive solenoid rests on limit stoppers mounted near the center of the carriage shaft. The drive solenoid is held in place on the carriage stopper by means of springs that would prevent unwanted movement. Both solenoids receive their electrical power or signals by means of electrical contact rails, tracks, contact rollers, brushes, or other such devices or methods.

In one embodiment, the mounting bracket and the carriage bracket have bumpers or bumper segments both upper and lower pleats. If the engine is in a vertical position, the carriage would rest on the lower or bottom bumpers.

The startup of the engine is as follows. At first, the mounting bracket is attached to or on the object or device that would be propelled. Once it is attached, the pilot or operator will energize the initiatory solenoid coil. Once energized, its plunger rapidly moves towards the drive solenoid plunger extended portion. Upon striking it, instantaneously energizes the drive solenoid coil that rapidly strikes the top pleat of its carriage bracket with such force that it propels its carriage bracket towards the bumper at the top of the mounting bracket with such force thus propelling the object or device in the direction of impact. Once the initiatory plunger strikes the extended portion of the drive solenoids plunger, it will be de-energized. When the drive solenoid strikes the bumper at the top of the mounting bracket it de-energizes and returns to the original position by return springs. This type of firing action is repeated over and over again thus providing continuous propulsion.

Once the engine is in operation, simply aim the top pleats of the engine in a desired direction. For example, if the engine is mounted on a universal coupling that is connected to a platform and positioned vertical or upright simply by attaching to the engine, hydraulic or servomechanism for direction control is used. Also, one or more cables and other such devices could be used to control the direction of the engine propulsion force thus elevating the platform and moving it laterally. The engines have helicopter characteristics. If more accurate direction control is needed smaller additional version of the engine can be placed on the same platform at key points. Further, the engine is designed with different configurations.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF EXAMPLE EMBODIMENTS

Figure 1:
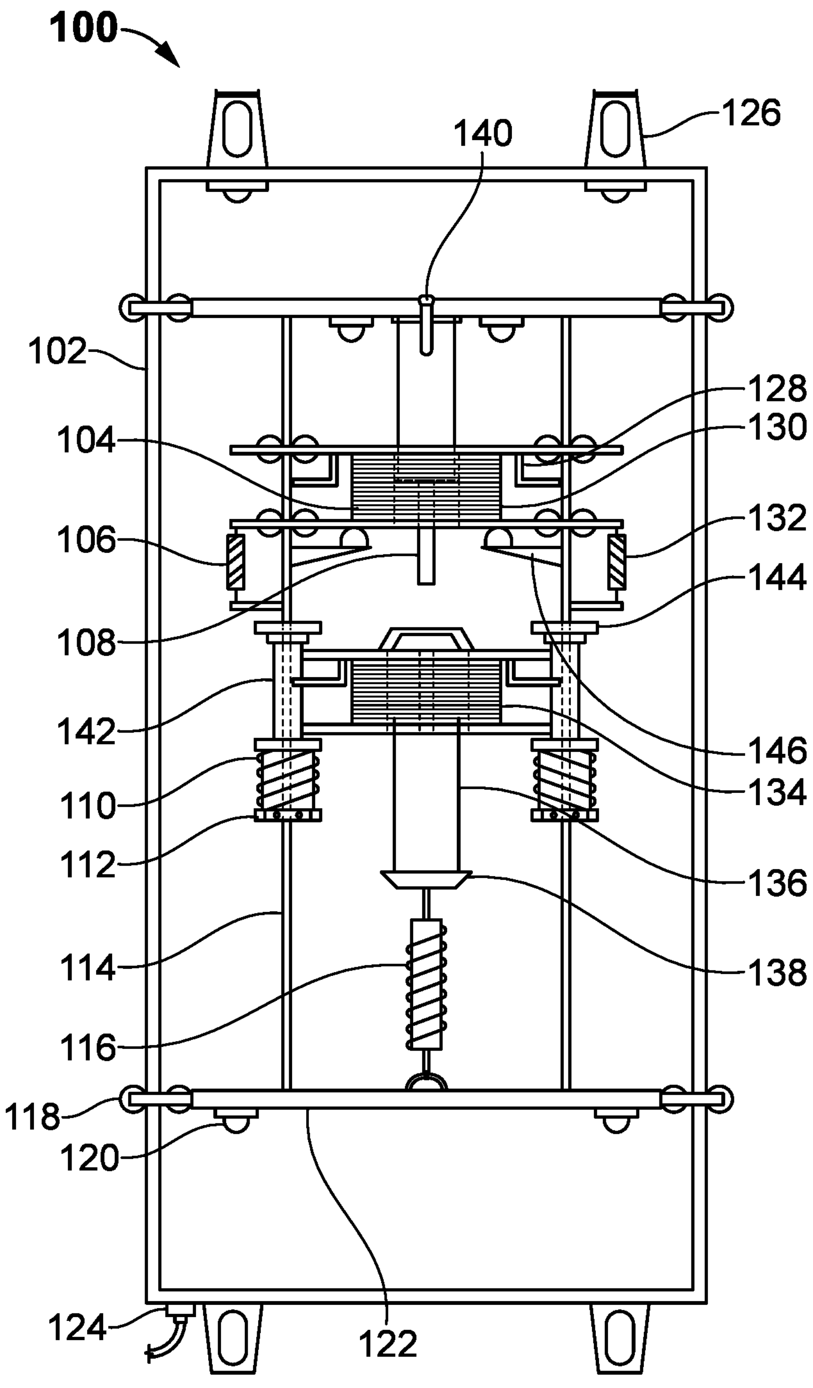
FIG. 1 shows a front view of an engine device for generating continuous lift operation in an embodiment of the present invention.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

According to the present invention, an engine device is configured to generate a continuous lift operation by the means of one or more solenoids. In one embodiment, the engine generates a continuous lift operation using at least two solenoids including a first solenoid/solenoid coil and a second solenoid/solenoid coil. The solenoids are set in tandem. In one embodiment, the first solenoid is an impact initiatory and the second solenoid is a drive solenoid. The first solenoid coil has a first plunger and the second solenoid coil has a second plunger. Both solenoid coils are open ended, thereby allowing the plungers to move from the front to the back of its solenoid coil. The purpose of this type of solenoid is so that the first plunger can be poised in position behind the second solenoid plunger.

In one embodiment, the engine further comprises one or more brackets. In one embodiment, the engine comprises at least two brackets including a carriage bracket and a mounting bracket. Both the solenoids and the plungers are mounted on the carriage carriage bracket. In one embodiment, the carriage bracket is connected to the mounting bracket through a system of wheels, bearings, or lubrication that will allow the carriage bracket to reciprocate freely in a linear motion on its mounting bracket.

In one embodiment, the mounting bracket is attached to a device or load that would be propelled. The mounting bracket is longer and wider than the carriage bracket, thereby giving the carriage bracket clearance to move in the confine of the mounting bracket. In one embodiment, the impact initiatory solenoid coil is mounted on springs near the rear or bottom portion of the carriage bracket shaft. The springs rest on stoppers that hold them in a fixed portion on the shaft. The initiatory impact solenoid coil plunger has a flange on each opposite end, thereby preventing the plunger from leaving its solenoid coil. The impact initiatory solenoid plunger rests its flange on the top of its coil poised for firing. The majority of the plunger protrudes out the bottom of the solenoid coil.

In one embodiment, both solenoids have elongated portions that would be narrower than the main portion of the plunger, so that the main portion can be positioned below the threshold of its solenoid coil for maximum velocity. That is, the plunger did not center its coil at this time and the initiatory solenoid plunger is held in portion by a spring that is attached from the bottom of the plunger to the bottom plate of the carriage to the top portion of the initiatory solenoid coil that is connected to the carriage shaft. The carriage shaft has a stopper to limit its reciprocating movement.

In one embodiment, the drive solenoid/second solenoid is mounted directly over the number one or initiatory solenoid and plunger. The drive solenoid plunger is attached to the top pleat of the carriage in a fixed portion that would allow little or no movement, however its solenoid coil is allowed to move from the approximate center to the top of the carriage pleat. The drive solenoid rests on limit stoppers mounted near the center of the carriage shaft. The drive solenoid is held in place on the carriage stopper by means of springs that would prevent unwanted movement. Both solenoids receive their electrical power or signals by means of electrical contact rails, tracks, contact rollers, brushes, or other such devices or methods.

In one embodiment, the mounting bracket and the carriage bracket have bumpers or bumper segments both upper and lower pleats. If the engine is in a vertical position, the carriage would rest on the lower or bottom bumpers.

The startup of the engine is as follows. At first, the mounting bracket is attached to or on the object or device that would be propelled. Once it is attached, the pilot or operator will energize the initiatory solenoid coil. Once energized, its plunger rapidly moves towards the drive solenoid plunger extended portion. Upon striking it, instantaneously energizes the drive solenoid coil that rapidly strikes the top pleat of its carriage bracket with such force that it propels its carriage bracket towards the bumper at the top of the mounting bracket with such force thus propelling the object or device in the direction of impact. Once the initiatory plunger strikes the extended portion of the drive solenoids plunger, it will be de-energized. When the drive solenoid strikes the bumper at the top of the mounting bracket it de-energizes and returns to the original position by return springs. This type of firing action is repeated over and over again thus providing continuous propulsion.

Once the engine is in operation, simply aim the top pleats of the engine in a desired direction. For example, if the engine is mounted on a universal coupling that is connected to a platform and positioned vertical or upright simply by attaching to the engine, hydraulic or servomechanism for direction control is used. Also, one or more cables and other such devices could be used to control the direction of the engine propulsion force thus elevating the platform and moving it laterally. The engines have helicopter characteristics. If more accurate direction control is needed smaller additional version of the engine can be placed on the same platform at key points.

Figure 2:
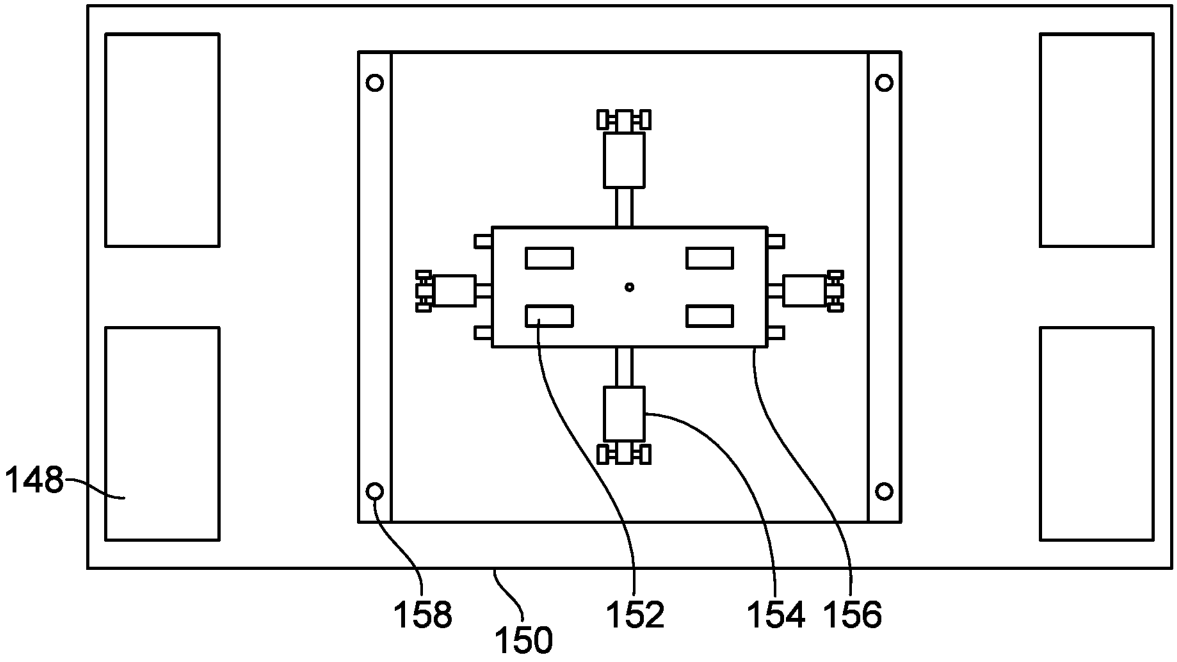
FIG. 2 shows a top view of the engine device in one embodiment of the present invention.
Figure 3:
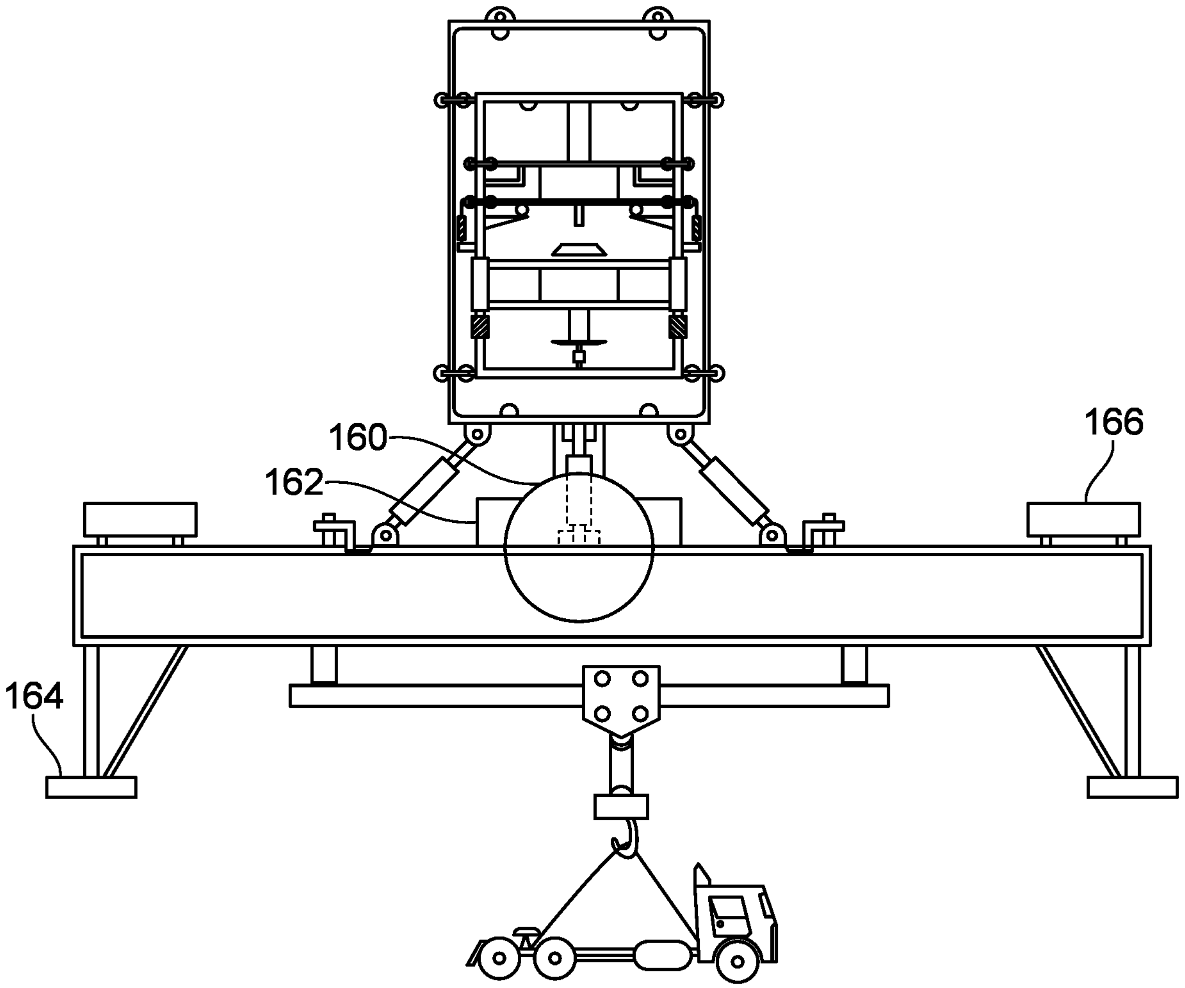
FIG. 3 shows the mounting of the engine device on a platform in one embodiment of the present invention.

Referring to FIGS. 1-3, different views of an engine device or engine 100 for generating continuous lift operation, according to an embodiment of the present invention. The engine 100 comprises two brackets including a mounting bracket 102 and a carriage bracket. In one embodiment, the engine 100 further comprises one or more mounting points 124 for mounting brackets 102, electrical connection 126, and an electrical contact point 128. The engine 100 further comprises a solenoid having a solenoid center 104 and one or more solenoid return springs 106. In one embodiment, a plunger extended portion 108 is extended outward from the solenoid center 104. In one embodiment, the engine 100 further comprises two solenoids including a drive solenoid coil 130 and an initiatory solenoid coil 134. The initiatory solenoid coil 134 is disposed between a pair of initiatory sleeve pipes 142. Each initiatory sleeve pipe 142 is provided with a. sleeve pipe bearing 148. In one embodiment, an initiatory solenoid shock absorber 110 is positioned at a lower end of each initiatory sleeve pipe 142. A spring limiter or retaining fitting 144 is attached at a top end of each initiatory solenoid shock absorber 110. Further, a pair of carriage shafts 114 extends via the pair of initiatory sleeve pipes 142. A lower end of each carriage shaft 114 is attached to a bottom plate 12 of the carriage bracket. In one embodiment, the carriage bracket further comprises a carriage wheel assembly 118 and one or more carriage bumpers 120.

In one embodiment, the drive solenoid coil 130 has a second plunger or drive plunger and the impact initiatory solenoid coil 134 has a first plunger or initiatory plunger 136. The initiatory plunger 136 has a plunger flange 138 at its lower end. In one embodiment, the initiatory plunger 136 is attached to the bottom plate 122 of the carriage via an initiatory plunger return spring 116. In one embodiment, the drive solenoid coil 130 is positioned in place using a drive solenoid position bumper 146.

FIG. 2 shows a top view 158 of the engine 100, according to one embodiment of the present invention. In one embodiment, the engine 100 comprises a lateral control unit 150 having a platform 152 with platform mounting points 154. The lateral control unit 150 further comprises direction control pistons 156 for main engine 100. FIG. 3 shows the mounting of the engine 100 on the platform 152, according to one embodiment of the present invention. In one embodiment, the engine 100 further comprises an engine mount 160, a platform second deck 162, a universal ball joint 164, a universal ball joint socket 166, and a universal joint machine connector 168.

In one embodiment, the engine's initiatory solenoid coil 134 is configured to remove or minimize unwanted recoil from the drive solenoid coil 130 by striking its fixed plunger with its moving plunger thus neutralizing or defusing a great amount of recoil from the drive solenoid coil 130, thus allowing the drive solenoid coil 130 to strike the upper plate with a greater amount of force and propulsion. If the power is increased on the drive coil automatically would be increased on the initiatory by means of the component position censors that go into a master control. However the operator can change this order if needed. Once the drive solenoid coil 130 strikes the upper plate of its carriage with continuous impact action and in turn continuously impacts the mounting upper plate this will leave some space between the bottom plate of the carriage and the bottom plate of the mounting bracket 102, this space helps to avoid counter acting downward force, the initiatory solenoid plunger 136 can also generate recoil energy when energizing at the start up however once in operation carriage will be aloof toward the top end of the mounting bracket 102.

The initiatory solenoid coil 134 has a little recoil because the initiatory plunger 136 strikes the drive solenoid fixed plunger so fast that it would quickly neutralize its recoil as well as the recoil from the drive solenoid 130. The initiatory or sometimes call the initiator solenoid coil firing program would normally de-energize for its plunger (completely centers). This would allow the accelerated mass of its plunger to strike its target, however, the operator can charge its firing program if needed. The increase in velocity of the plunger will increase its mass. The increase of the drive will increase its mass that will register on impact.

The drive solenoid 130 in some cases does not have to wait for the initiatory plunger 136 to strike its plunger, the pilot or operator can program a pre-firing of the drive solenoid 130 just before the initiatory strikes it, this versatility is given to the pilot or operator for test purposes.

In one embodiment, the engine 100 further comprises a plunger with a narrow portion. The narrow portion has a little or no magnetic permeability, thereby eliminating interference or detraction from the larger magnetic permeability portion by the solenoid.

Figure 4:
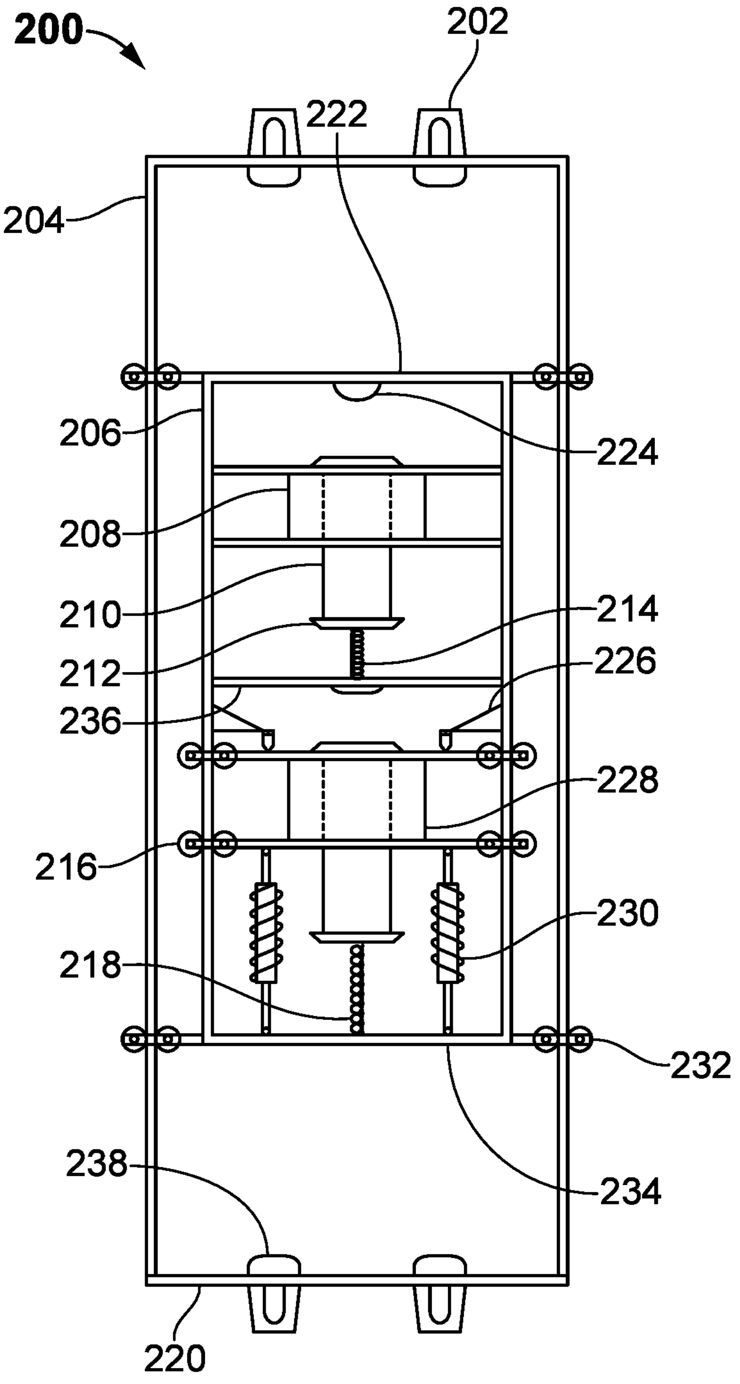
FIG. 4 shows a front view of an engine device for generating continuous lift operation in another embodiment of the present invention.

Referring to FIG. 4, a front view of an engine device or engine 200 for generating continuous lift operation, according to another embodiment of the present invention. The engine 200 comprises a mounting bracket 204 having one or more mounting bracket mounting points 202 on a mounting bracket platform 238. The engine 200 works on the same principles as the main engine 100, however instead of using a movable drive solenoid coil 208 with a fixed plunger. It uses a fixed solenoid coil and a moving plunger to impact its upper carriage plate 222 thus generating lift. Once its initiatory solenoid coil 228 is energized and its plunger impacts the base plate 236 of its carriage 206 thus removing most of the unwanted recoil from the drive solenoid plunger 210. In one embodiment, the drive solenoid plunger 210 is provided with a drive solenoid plunger flange 212.

In one embodiment, the engine 200 has a small distinct physical difference from the main design, in which the initiatory solenoid 226 and plunger are suspended by springs. The solenoid would have wheels or bearing assembly (216 and 232) on each side that would allow the solenoid to reciprocate when operation using its return springs 230. One end of the return spring 230 is attached to a bottom carriage plate 234. Also, the engine 200 has a base plate 236 mounted on the carriage 206 that impacts the initiatory solenoid plunger. Both drive solenoid plunger 210 and initiatory plunger have return springs (214, 218, and 230). Also, the initiatory solenoid coil 128 limits the stoppers that keep the coil from access movement on the carriage 206. Further, the carriage 206 is provided with a carriage bumper 224.

Similar to the main engine 100, the engine 200 incorporates the initiatory solenoid 226 that removes unwanted recoil from the drive solenoid coil 208 thus allowing the drive solenoid plunger 210 to strike or impact the bottom plate 220 of its carriage 206 that in turn impacts an upper carriage plate 222 of its mounting bracket 204, thus producing a propelling force. It can propel cars, boats, aircrafts, and so on. Once the operator activates the engine 200, it generates continuous firing, thereby providing continuous propulsion until turn off.

Figure 5:
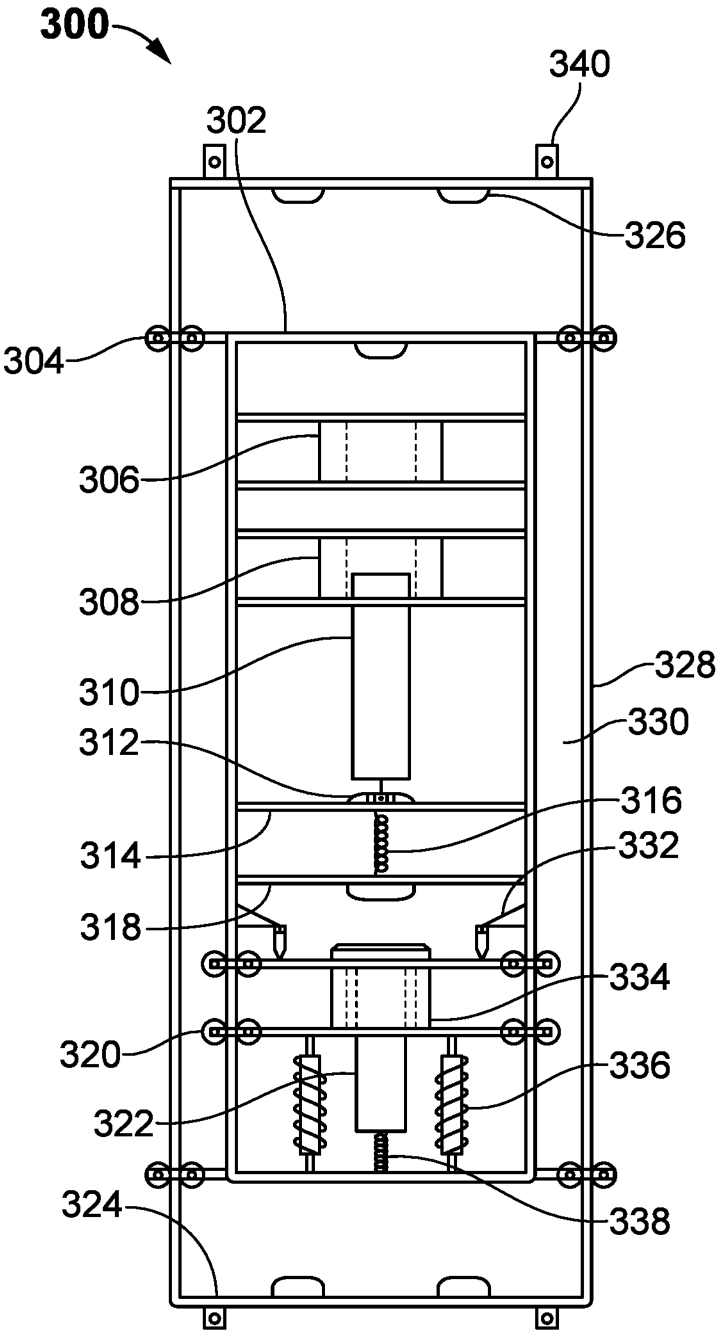
FIG. 5 shows a front view of an engine device for generating continuous lift operation in yet another embodiment of the present invention.

Referring to FIG. 5, a front view of an engine device 300 for generating continuous lift operation, according to yet another embodiment of the present invention. The engine 300 works on the same principles as the engine 200 and the main engine 100, however the engine 300 can produce more power due to its two-stage firing action. This is accomplished using the two in line solenoid coils that are spaced apart in tandem with a single plunger. The two solenoid coils are the bottom solenoid coil or first solenoid coil 308 and a second solenoid coil 306. The plunger 310 is poised in the threshold of the first solenoid coil 308. The plunger 310 is held in position by a solenoid return spring 316 and solenoid return bumper 312 that runs through an opening in a base plate 314 where the plunger 310 is held at rest. The engine 300 further comprises an upper carriage 302, carriage wheel assembly 304, lower base plate 318, initiatory solenoid wheel assembly 320, bottom plate of mounting bracket 324, upper impact bumper of mounting bracket 326, initiatory solenoid mint bumpers 332, and one or more mounting points 340.

The two solenoids (306 and 308) are fixed on the carriage 330 but the initiatory solenoid 334 is on a moveable platform that rides on a portion of the carriage 330. The initiatory solenoid coil 334 is suspended by springs 316 that returns the solenoid with its plunger 310 in its poised position for re-firing. In some embodiments, the initiatory solenoid 334 can combine a shock absorber and springs (336 and 338). The shock absorber is used to minimize the recoil on the carriage 330 and at the same time to maximize the impact on its base plate 314 to its resistant downward movement of the initiatory solenoid 334 when it is energized.

Once the initiatory solenoid 334 is energized, its plunger 322 instantly impacts its base plate 314 and instantaneously energizes the first solenoid coil 308 by means of electrical contacts or censors that in turn propel its plunger 322 at such a velocity that instantly enters the threshold of the second solenoid coil 306, which energizes the second solenoid coil 306 and simultaneously de-energizes the first solenoid coil 308. The first solenoid coil 308 is now free from the first solenoid's magnetic influence. The second solenoid 306 greatly increases the velocity of the plunger 310 thus impacting the upper plate of its carriage 302 and producing a lift and in turn impacting the upper plate of its mounting bracket 328 thus producing a propelling force. It can propel cars, boats, aircraft, and so on. The impact must be continuous for continuous lift.

Figure 6:
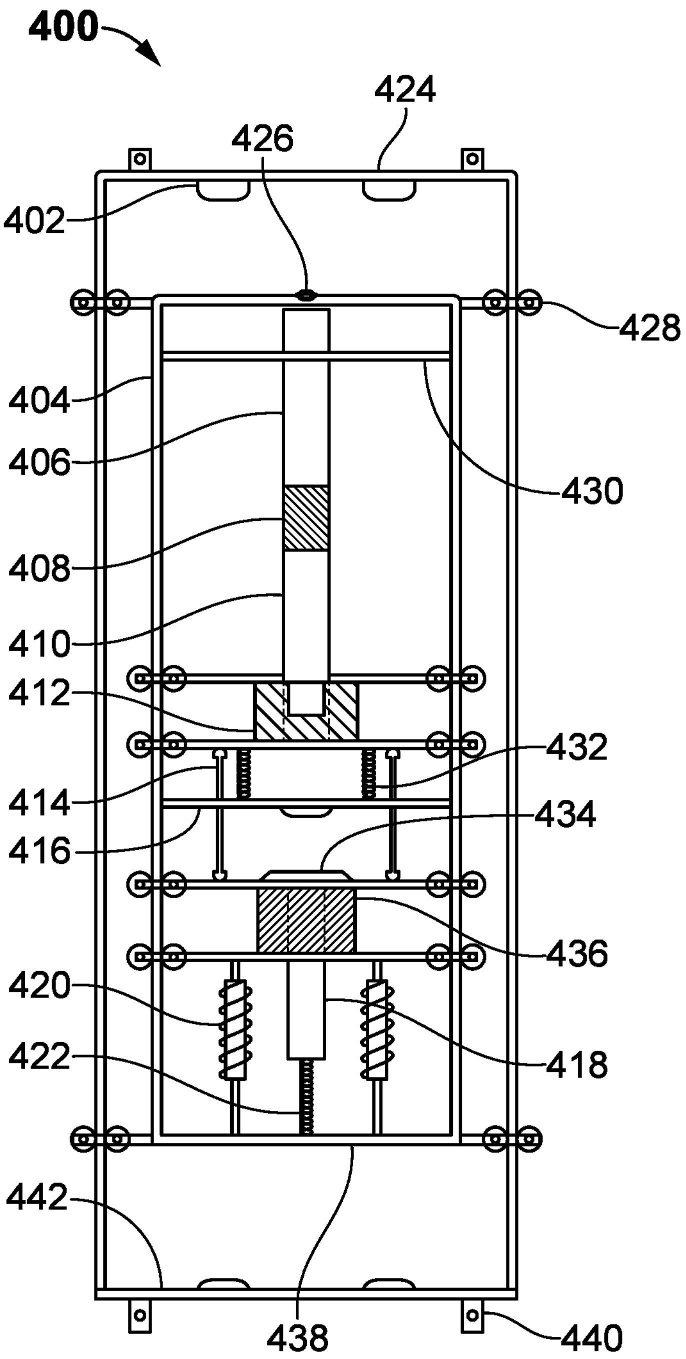
FIG. 6 shows a front view of an engine device for generating continuous lift operation in still another embodiment of the present invention.

Referring to FIG. 6, a front view of an engine device 400 for generating continuous lift operation, according to still another embodiment of the present invention. The engine 400 works on the same principles as engines (200 and 300) and the main engine 100, however, the engine 400 varies in design. The engine 400 has fixed plungers 406 mounted in tandem but separated by a none magnetic material that holds them together. The plungers 406 are secured to the top plate of the carriage. The plunger is also held straight by an alignment plate 430 that also serves as an impact plate for the solenoid coil. The solenoid coil is equipped with a wheel or some type of bearings that would allow it to freely reciprocate up and down a portion of the carriage 404 when it is in operation. The engine's 400 solenoid coil is called the drive coil 412 and like the other engines it has initiatory solenoid 436 and plunger 418 that would minimize or remove recoil from the drive solenoid coil 412 when its energized the initiatory linear motion. The carriage 404 resides on its mounting with wheels or bearing assembly 428 that allows it on its mounting bracket 402 and the bracket mount on the device wants to propel. The mounting bracket 402 is provided with one or more mounting points 440. In one embodiment, the engine 400 further comprises a lower base plate extended portion 414, one or more return spring 420, a solenoid plunger retaining screw 426, an initiatory plunger flange 434, and a carriage bottom or lower plate 438.

The drive solenoid coil 412 for activation would be held in place by springs/solenoid return spring 432 or other such devices that the solenoid coil rest on its base plate 416. The initiatory solenoid 436 would be suspended using a solenoid return spring 422 however spring and shock combine can be used however for test purposes the initiatory can be fixed mount. When the initiatory solenoid 436 is energized its plunger 418 instantaneously energizes or activates the drive solenoid coil 412 that instantly propels itself along the first fixed plunger and just before the drive solenoid coil 412 centers or center the first plunger it would be de-energized by its sensors. The coil momentum rapidly propels it to pass the none magnetic permeable material 408 to the next fixed plunger once the coil reaches the threshold of the second plunger the censor re-energizes the first solenoid coil 410 thus boosting its velocity and its impact on its upper plate 424 of its carriage 404 thus producing a greater impact on its mounting bracket and thus producing population on the body in which it is attached.

Figure 7:
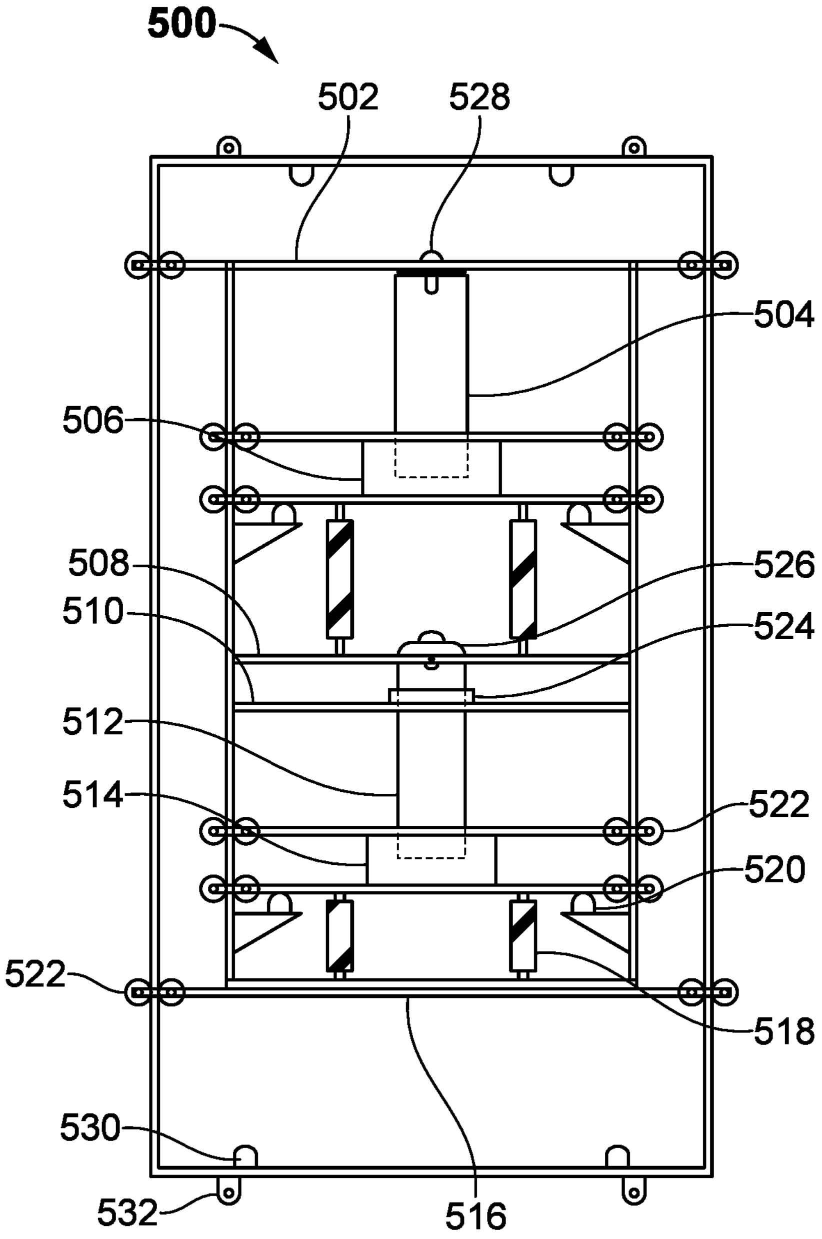
FIG. 7 shows a front view of an engine device for generating continuous lift operation in still even another embodiment of the present invention.

Referring to FIG. 7, a front view of an engine device 500 for generating continuous lift operation, according to still even another embodiment of the present invention. The engine 500 works on the original main concept of propulsion units. The engine 500 works on the same firing principal as the main engine 100, however, the engine 500 varies in design. In one embodiment, the engine 500 uses at least two moving solenoid coils with fixed plunger to perform the continuous lift operation. The engine 500 comprises a lifting unit and a drive solenoid coil 506. The drive solenoid coil 506 is on its carriage bracket that impacts an upper carriage plate or carriage top plate or upper plate or fixed impact plates or impact plates 502 when energized on a fixed solenoid plunger or fixed plunger 504. The engine 500 further comprises an initiatory moving solenoid coil or initiatory solenoid coil or initiatory coil 514. The initiatory solenoid coil 514 impacts a coil impact plate 510 with an initiatory fixed plunger or fixed plunger 512.

Both solenoid coils (506 and 514) are open-ended. The open-ended design allows their fixed plungers (504 and 512) to pass completely through the respective solenoid coils (506 and 514). Thus allows the solenoid coils (506 and 514) to stick to their respective impact plates (502 and 510) when in operation. The engine 500 further comprises a bottom carriage plate or carriage bottom plate or bottom plate 516, an initiatory coil limit bumper 520, one or more carriage wheel assemblies 522, a plunger alignment bearing 524, a shock absorber device 526, at least one plunger mounting screw 528, one or more mounting bumpers 530, and a plurality of mounting points 532 for mounting bracket.

Each solenoid coil (506 and 514) has its own individual plunger (504 and 512) mounted to a respective fixed impact plate or upper plate (502 and 510). The solenoid coils (506 and 514) are mounted in tandem by being directly aligned using a plunger alignment bearing 524. Each solenoid coil (506 and 514) has one or more return springs 518 configured to keep both the solenoid coils (506 and 514) at their starting points resting on their limit stoppers. Once the initiatory solenoid coil 514 is energized, it instantly impact its impact plate 510 and simultaneously energizing the drive solenoid coil 506. The initiatory solenoid coil 514 is simultaneously de-energized by impacting its impact plate 510, which absorbs the recoil of the drive solenoid coil 506 when first energized. The drive solenoid coil 506 impacts its carriage upper plate or impact plate 502 for producing lift and in turn the carriage impacts the impact plate 502 of the mounting bracket thus producing a propelling force.

Advantageously, the engine operates in a complete vacuum unlike conventional aircraft, such as jets, propeller airplanes, or roto aircraft such as helicopters. The engine does not produce or expel gases or air to produce lift. Also, the engine does not have dangerous roto blades as a helicopter does when the helicopter is in operation also the helicopter has limitations in its design. The rotor blades limit the helicopter's ability to get close beside natural structures or building.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An engine device for generating a continuous lifting operation, comprising:

a first solenoid and a second solenoid, the first solenoid being an impact initiatory and the second solenoid being a drive solenoid, the first solenoid and the second solenoid being configured to be positioned in tandem by being directly aligned, wherein the first solenoid includes a first plunger and the second solenoid includes a second plunger, the first solenoid being configured to be open ended to allow the first plunger to move from a front to a back of the first solenoid, the second solenoid being configured to be open ended in a manner that allows the second plunger to move from a front to a back of the second solenoid; and wherein the first solenoid and the first plunger are configured to be positioned on a carriage bracket, the carriage bracket being connected to a mounting bracket in a manner that allows the carriage bracket to reciprocate freely in linear motion on the mounting bracket.

2. The engine device for generating a continuous lifting operation as in claim 1, wherein the carriage bracket is connected to the mounting bracket by a plurality of wheels.

3. The engine device for generating a continuous lifting operation as in claim 1, wherein the carriage bracket is connected to the mounting bracket by a plurality of bearings.

4. The engine device for generating a continuous lifting operation as in claim 1, wherein the mounting bracket is connected to a load.

5. The engine device for generating a continuous lifting operation as in claim 1, wherein the mounting bracket is larger than the carriage bracket.

6. The engine device for generating a continuous lifting operation as in claim 1, wherein the impact initiatory is mounted on a spring.

7. The engine device for generating a continuous lifting operation as in claim 6, wherein the spring is mounted on a stopper, which is configured to hold the spring.

8. The engine device for generating a continuous lifting operation as in claim 1, wherein the impact initiatory includes the first plunger being an initiatory solenoid coil plunger having a flange on each opposite end, thereby preventing the initiatory impact solenoid coil plunger from leaving the first solenoid coil.

9. The engine device for generating a continuous lifting operation as in claim 8, wherein the impact initiatory solenoid plunger positions the flange on a top of the first solenoid coil.

10. The engine device for generating a continuous lifting operation as in claim 1, wherein the mounting bracket and the carriage bracket each have first and second bumpers and each have first upper and second upper pleats and first and second lower pleats.

11. An engine device for generating a continuous lifting operation, comprising:

two solenoids each open ended and directly aligned and positioned in tandem; and two plungers configured to move between a front and a back of respective ones of the two solenoids, wherein one of the two solenoids constitutes an impact initiatory and a remaining one of the two solenoids constitutes a drive solenoid, the impact initiatory and a respective one of the two plungers that is associated with the impact initiatory being configured to be positioned on a carriage bracket, the carriage bracket being connected to a mounting bracket that is configured to allow the carriage bracket to reciprocate freely in linear motion on the mounting bracket.

* * * * *